T. J. THORP.
WHEEL.
APPLICATION FILED APR. 23, 1906.
912,919.
Patented Feb. 16, 1909.
2 SHEETS—SHEET 1.
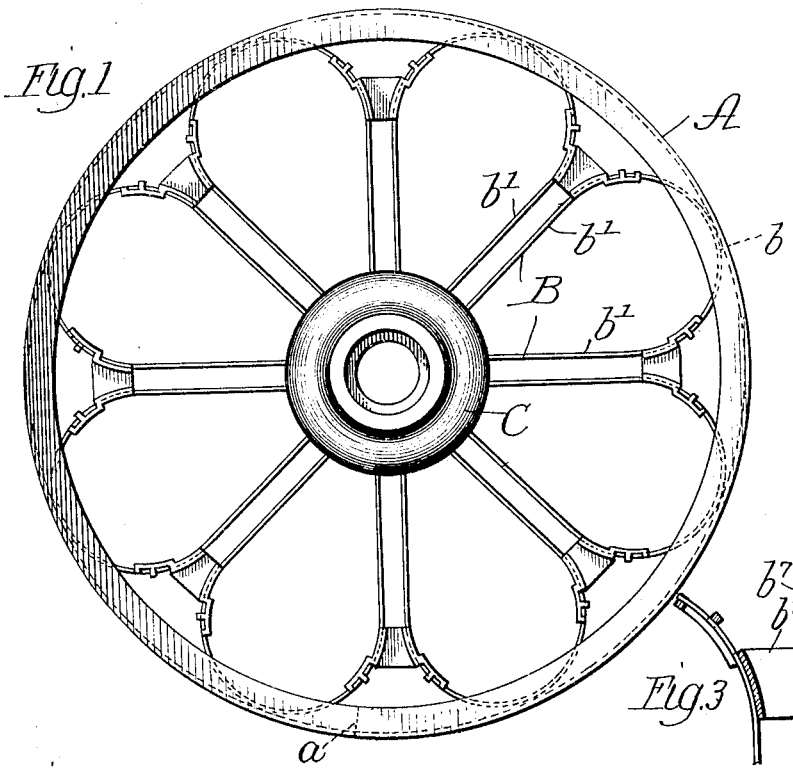
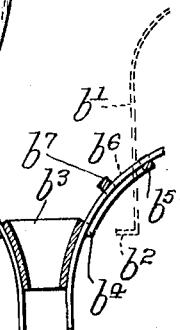
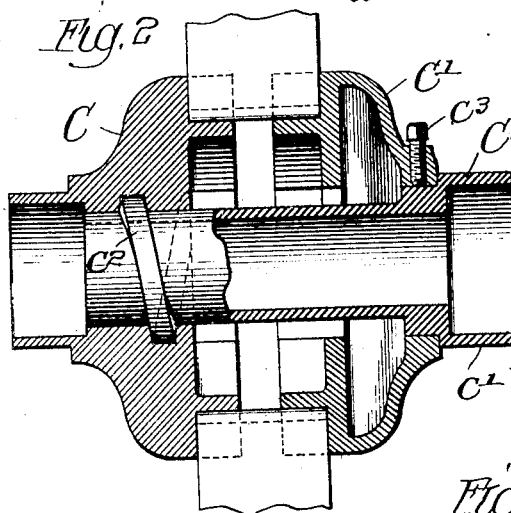
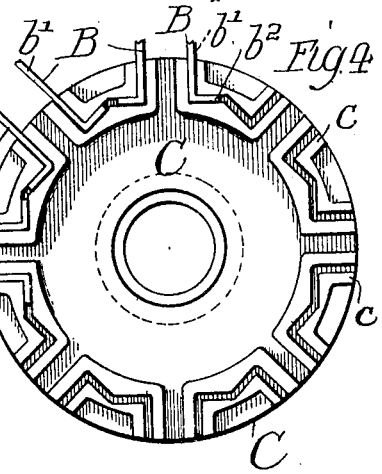
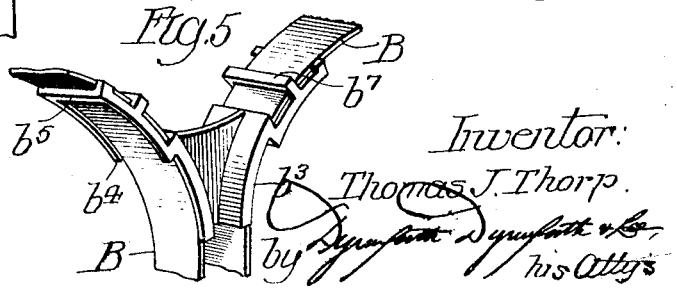
Inventor:
Thomas J. Thorp.

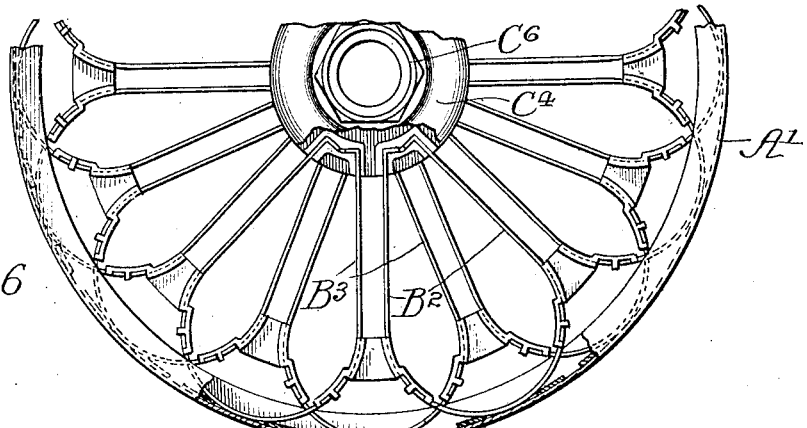
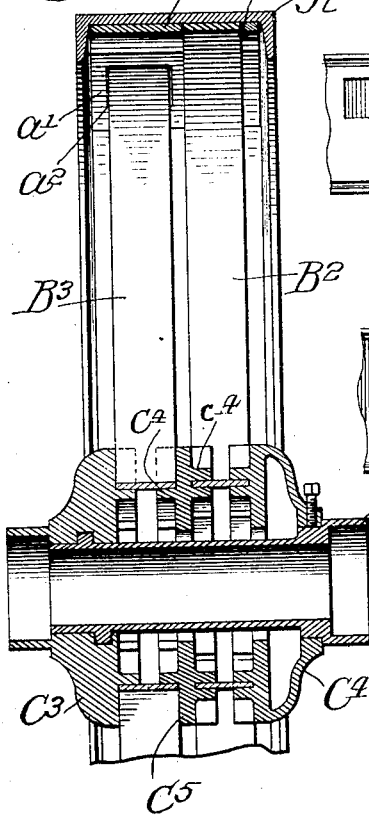
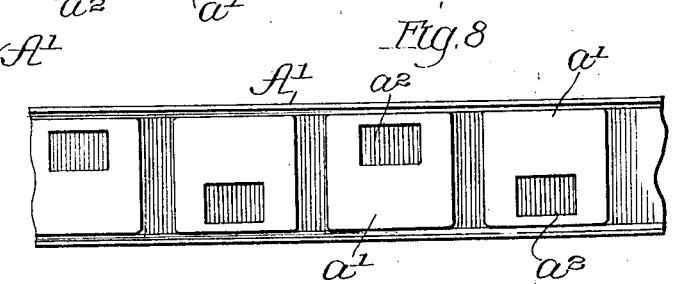
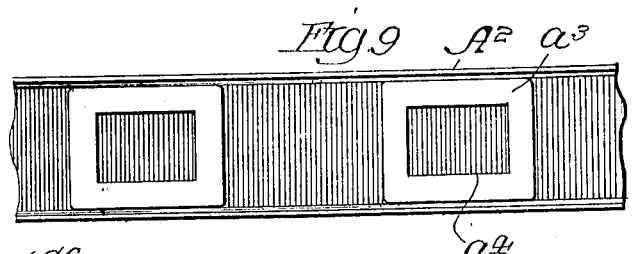
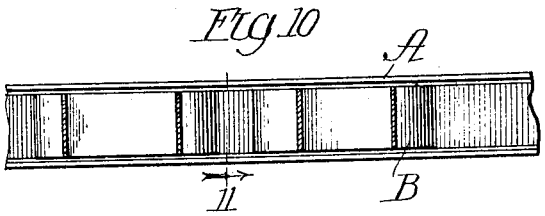
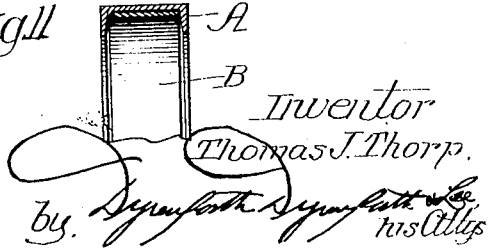

UNITED STATES PATENT OFFICE.

THOMAS J. THORP, OF CORVALLIS, OREGON.

WHEEL.

No. 912,919.  Specification of Letters Patent.  Patented Feb. 16, 1909.

Application filed April 23, 1906. Serial No. 313,338.

*To all whom it may concern:*

Be it known that I, THOMAS J. THORP, a citizen of the United States, residing at Corvallis, in the county of Benton and State of Oregon, have invented a new and useful Improvement in Wheels, of which the following is a specification.

My invention relates particularly to metal wheels and my primary object is to provide a strong, resilient and durable wheel which can be manufactured at a moderate price and the parts of which can be readily assembled.

The invention is illustrated in the accompanying drawings, in which—

Figure 1 is a side elevational view of a wheel constructed in accordance with my invention; Fig. 2, an enlarged broken sectional view of the hub-portion of the wheel; Fig. 3, a broken sectional view illustrating the connection between the outer or loop ends of the spokes; Fig. 4, an inner face view of one of the hub sections employed, portions of certain of the spokes being shown; Fig. 5, a perspective view of fragments of two spokes and the tie-member connecting them; Fig. 6, a broken side elevational view of a wheel of heavier construction than that shown in Fig. 1, two series of spokes being employed in the wheel in this form; Fig. 7, a broken sectional view of the wheel shown in Fig. 6; Fig. 8, an inner view showing a development of the portion of the tire employed in the construction shown in Figs. 6 and 7, this view showing, also, the sockets which receive the outer or loose ends of the spokes; Fig. 9, a similar view of a tire with sockets for receiving a single series of spokes, the tire being wider than the spokes; Fig. 10, a similar view showing a tire and spokes of approximately the same width, rendering unnecessary the use of socket-plates at the tire; and Fig. 11, a sectional view taken as indicated at line 11 of Fig. 10.

Referring to Figs. 1 to 5 inclusive and Figs. 10 and 11, the wheel there shown comprises a tire A formed of steel-channel bar having its ends welded together at $a$; loop-form spokes B having their loop ends fitting within the channel of the tire in the manner shown in Figs. 10 and 11; a hub comprising sections C, C$^1$, and a barrel or thimble C$^2$. Each spoke B is formed of a bar of steel curved to form a loop end $b$ and having radial members $b^1$, whose inner ends are turned away from each other at approximately right-angles to the members to form retainer ends, or socket-entering portions $b^2$. Adjacent members $b^1$ of adjacent spokes are tied together by members $b^3$, each member $b^3$ having two curved channels $b^4$ for receiving the curved portions of the spokes. As shown, the channels $b^4$ are formed partially in curved wings $b^5$ with which each member $b^3$ is provided, and each wing $b^5$ has an opening $b^6$ through which the spoke may be passed beneath the loop $b^7$ in making the connections. Each of the hub-sections C, C$^1$ is provided on its inner vertical surface with laterally open sockets $c$, each socket being formed to receive a retainer $b^2$ and the adjacent portion of the member $b^1$ of two adjacent spokes. Said hub-sections are formed with central bores for receiving the tubular member C$^2$. The member C$^2$ has an enlargement $c^1$, which may be of hexagonal form externally to receive a wrench; and at the other end is a cam or screw-thread $c^2$ which works within a groove or thread in the hub-section C. Thus, when the spokes are entered in the sockets of the hub-sections, the hub-sections may be clamped together by turning the hub-section C$^2$ in its place. The set screw $c^3$ with which the hub-section C$^1$ is equipped serves to secure the tubular member against accidental displacement. The dotted lines in Fig. 3 indicate the manner of assembling the spokes with relation to the tie-member $b^3$; and it will be understood that after they are assembled with relation to the tie-members and inserted within the tire, the hub-sections are put in place, force being employed to cause the inner ends of the spokes to enter the hub-sections, if necessary. When thus assembled, the parts are under sufficient compression to cause the spokes to fit tightly within the tire. The assemblage of the parts is accomplished without the employment of bolts or screws. It will be observed that undue deformation of the tire will be resisted by all the spokes; and that undue deformation of the spokes will be resisted by the mutual reinforcement owing to the tying together of the spokes at their arched portions. At the same time, the spokes and tire are of resilient material, so that a desirable resiliency in the wheel is attained, sufficient to prevent breakage in the event of violent concussion or great shock.

In the construction shown in Figs. 6, 7, and 8; A$^1$ represents a tire; B$^2$ B$^3$ two series of loop-form spokes; C³, C⁴ and C⁵, hub-sections; and C⁶, a tubular member joining said hub-sections together and forming a bearing for the axle. In this construction, which is adapted for a heavy class of work, the channel-form tire A¹ receives within its channel socket-plates $a^1$ having staggered recesses $a^2$ for receiving the outer loop ends of the spokes. The hub-sections C³ C⁴ are similar to the hub-sections C C¹; and the intermediate hub-section C⁵ has laterally open sockets $c^4$ bearing a staggered relation and co-acting with the sockets of the hub-sections C³ C⁴.

In Fig. 9, A² represents a tire of channel-form equipped within its channel with socket plates $a^3$ having depressions $a^4$ in the same plane, perpendicular to the axis of the wheel, the depressions $a^4$ being of sufficient width to confine the loop ends of the spokes laterally. This construction is useful where the channel of the tire is of greater width than the spokes.

In all of the illustrations, the general construction of the wheel is the same. A detailed description has been given for clearness of understanding only, and no undue limitation is to be understood therefrom.

What I regard as new, and desire to secure by Letters Patent, is—

1. A wheel comprising a tire provided with means wherein the loop ends of loop-form spokes may be entered, loop-form spokes having their loop ends entered in the tire, boltless tie-members having channels receiving adjacent portions of adjacent spokes near the tire, and hub-sections having sockets receiving the inner ends of the spokes.

2. A wheel comprising a channel-form tire, socket-plates within the channel of the tire having spoke-receiving depressions of less width than the channel of the tire, loop-form spokes having their loop ends received by said socket-plates, and hub-sections connected with the inner ends of the spokes.

3. A wheel comprising a channel-form tire, socket-plates within the channel of the tire having spoke-receiving depressions bearing a staggered relation to each other, two series of loop-form spokes having their loop-ends received by the socket-plates, and hub-sections having sockets receiving the inner ends of the spokes.

4. A wheel comprising a tire, two series of loop-form spokes having their loop-ends received by the tire and their inner ends bent to form retainers, an intermediate hub-section having laterally open sockets, two outer hub-sections having laterally open sockets on their inner faces, and means securing said hub-sections together.

THOMAS J. THORP.

In presence of—
A. U. Thorien,
J. H. Landes.